J. A. MILLER.
HANDLE BAR MECHANISM FOR PLEASURE RAILWAYS.
APPLICATION FILED NOV. 6, 1911.

1,037,957.

Patented Sept. 10, 1912.
2 SHEETS—SHEET 1.

J. A. MILLER.
HANDLE BAR MECHANISM FOR PLEASURE RAILWAYS.
APPLICATION FILED NOV. 6, 1911.

1,037,957.

Patented Sept. 10, 1912.

2 SHEETS—SHEET 2.

Witnesses:
Charles J. Schmidt.
Nellie B. Dearborn

Inventor:
John A. Miller
By Offield, Towle, Graves & Offield
Attys.

UNITED STATES PATENT OFFICE.

JOHN A. MILLER, OF HOMEWOOD, ILLINOIS.

HANDLE-BAR MECHANISM FOR PLEASURE-RAILWAYS.

1,037,957.  Specification of Letters Patent. Patented Sept. 10, 1912.

Application filed November 6, 1911. Serial No. 658,629.

*To all whom it may concern:*

Be it known that I, JOHN A. MILLER, a resident of Homewood, in the county of Cook and State of Illinois, have invented certain new and useful Improvements in Handle-Bar Mechanism for Pleasure-Railways, of which the following is a full, clear, and precise specification.

My invention relates to handle bar mechanism for pleasure railways, and concerns particularly improved locking mechanism for locking said handle bar structures.

In pleasure railway systems where the track has sudden turns and rapid and steep inclines, handle bar mechanism is provided for affording a support to the occupants of the seats of the vehicle and also to act as guards for locking the passengers to the seats.

Among the important objects of the invention are to provide handle bar structures which can be swung into one position to allow ready entrance of passengers to the car seats and which can be swung to and locked in a second position to afford a rigid support for the passengers and to lock the passengers to the seats; to provide improved locking mechanism for the handle bar structures which will operate by gravity to move into locking engagements with the handle bar structures when said structures have been moved into their closed or locked positions; to provide improved actuating mechanism for positively adjusting the locking mechanism into locked or unlocked positions; to provide improved mechanism for positively locking the locking mechanism when it has been moved into locking position, so as to prevent accidental unlocking thereof or unlocking thereof by passengers of the car; to provide means whereby the actuating mechanism can be readily manipulated from the exterior of the car by attendants or automatically by engagement with stationary tripping mechanism; to provide a construction and arrangement for whose efficient operation springs are entirely unnecessary; and in general, to provide improved construction and apparatus of the character referred to.

Figure 1:
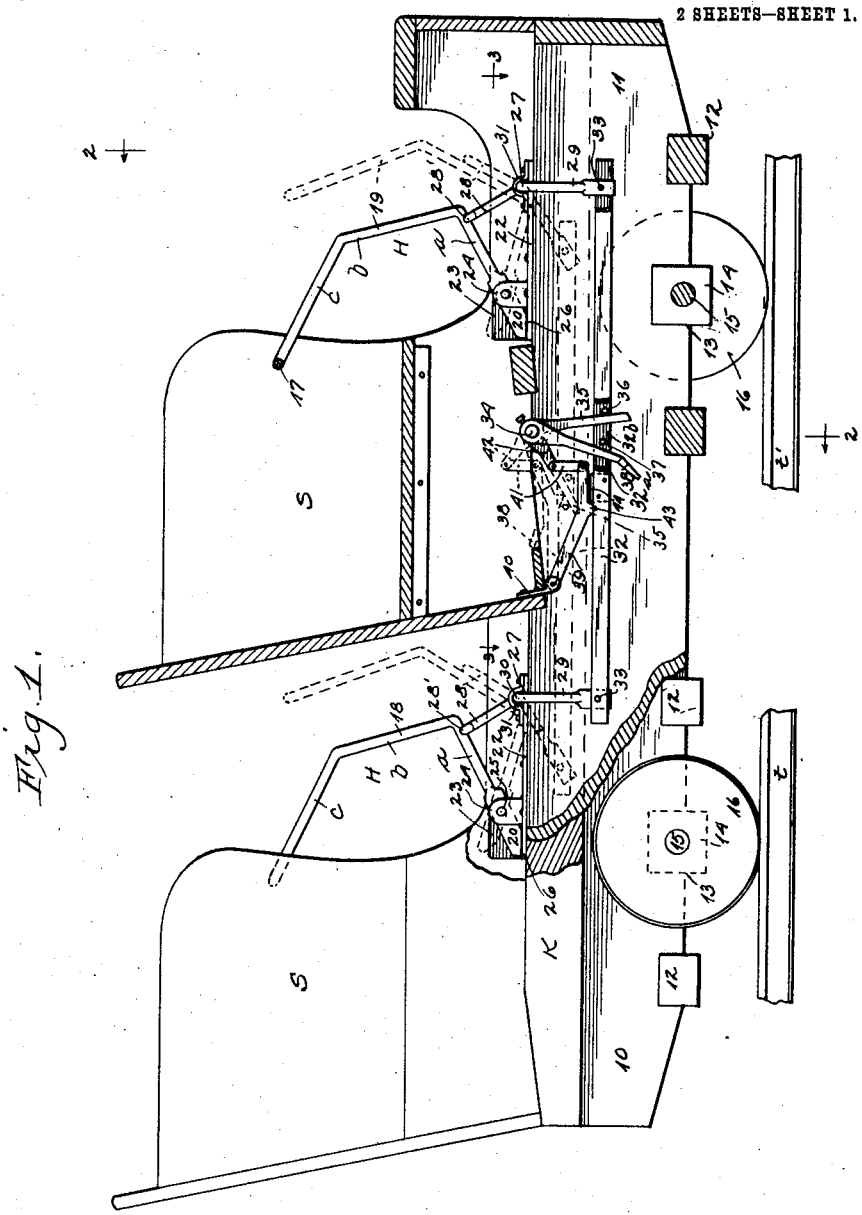
Figure 2:
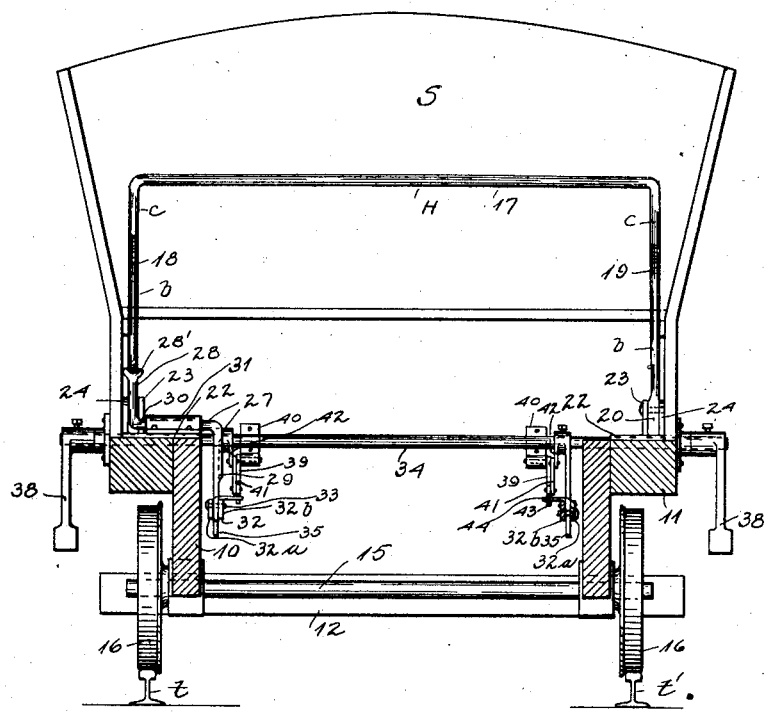
Figure 3:
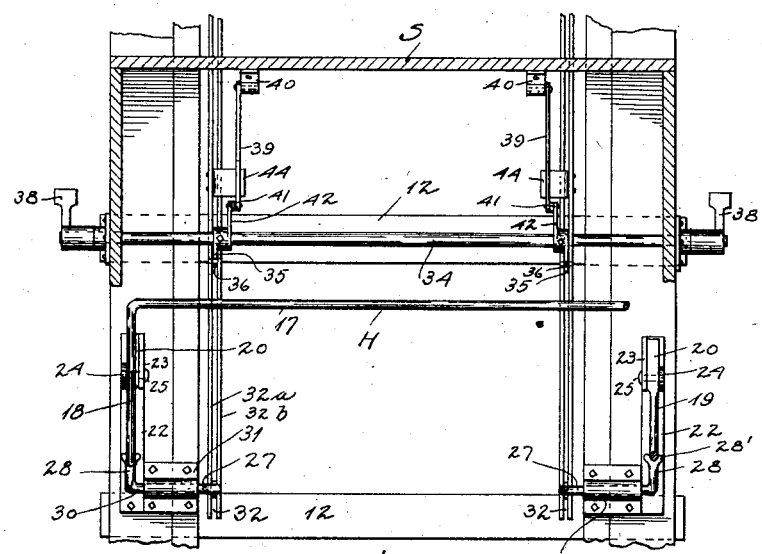

In the accompanying drawings illustrating one embodiment of my invention Figure 1 is a side elevational view of a pleasure vehicle, part of one side frame being removed, Fig. 2 is a sectional view taken substantially on plane 2—2, Fig. 1, and Fig. 3 is a sectional view taken on plane 3—3, Fig. 1.

The vehicle shown comprises a body part K having any number of seat frames S. As shown, the body part comprises two longitudinal side beam structures 10 and 11 connected together by suitable strengthening and bracing members 12, the side frames 10 and 11 having in their lower edges pockets 13 for receiving journal boxes 14 for journaling the axles 15 of suitable wheels 16, the vehicle running on rails $t$ and $t'$. Each handle bar structure H is of substantially U-shape, the yoke 17 thereof forming the supporting bar and the locking bar for locking passengers in the seats, the limbs 18 and 19 extending downwardly and pivoted at their lower ends to the vehicle body in front of the seats. Each handle bar structure may be formed of a cylindrical bar, the ends 20 of which are squared and are pivoted to bearing frames 22 secured to the car floor in front of the seat, the squared portion extending between the vertical wall 23 and the vertical lug 24 and pivoted by means of a pin 25. The lower end of each squared portion is also tapered off at 26 to abut with the base frame when the handle bar structure is in its inner or locked position, as shown in Fig. 1.

Associated with each handle bar structure at only one side thereof or at both sides thereof is a locking lever 27 substantially in the form of a bell crank lever having an upwardly extending arm 28 and a downwardly extending arm 29 and an intermediate horizontal section 30, this horizontal section being pivoted in a bearing which may be formed by a strap 31 secured to the base of the pivoted frame 22, as indicated in Fig. 1. The arm 29 extends downwardly on the inside of the adjacent vehicle side beam 10 or 11, while the arm 28 is outside of such side beam. As best shown in Fig. 2, the arm 28 has a forked end 28' for receiving the adjacent limb of the handle bar structure when such structure is in its locked position. As best shown in Fig. 1, the limbs of each handle bar structure are of substantially U-shape in horizontal direction, the lower sections $a$ extending forwardly and upwardly, the middle sections $b$ extending substantially upwardly, and the upper sections $c$ extending upwardly and inwardly, and the arm 28, when engaging with the lower sections $a$, is substantially at right angles to said section, thus forming a rigid lock for holding the handle bar structure in its inner or locked position with its beveled surface 26 abutting against the base of pivot frame 22. In this position of the handle bar structure the yoke 17 thereof forms a rigid support for the passengers and locks the passengers to the seats and prevents them from falling out as the car takes the sudden turns and grades.

The downwardly extending arms 29 for the various locking levers are parallel and pivoted at their lower ends to a horizontal connecting member 32, which member, as shown in Fig. 2, may consist of two flat bars 32$^a$ and 32$^b$ connected together by pins 33, to which the arms 29 are pivoted, the lower ends of the arms extending downwardly between the bars. Upon movement of the bar the locking levers 27 are simultaneously actuated. When the member 32 is down the locking levers connected therewith are in locking engagement with the respective handle bar structures, and when the bar is swung into upper position, as indicated in dotted lines in Fig. 1, the various locking levers are swung to carry their arms 28 forwardly of the vehicle and away from the handle bar structures, these arms 28 then forming abutments against which the handle bar structures may rest when in their open position, as indicated in dotted lines, Fig. 1.

The construction and arrangement of the levers 27 and member 32 are such that the member 32 will tend to drop by the force of gravity to carry the levers 27 into locking position, so that when passengers are entering the seats and all the handle bar structures have been drawn inwardly, the arms 28 of levers 27 will follow the handle bar structures and will assume their locking positions with reference to the handle bar structures.

To release the passengers at the end of a trip the member or members 32 can be swung upwardly and the handle bar structures are then simultaneously released and fall to their open positions. In order, however, to facilitate the operation of the locking levers, I provide special actuating mechanism therefor. Extending across the vehicle and journaled thereto is a shaft 34 to which is secured a downwardly extending arm 35, above each horizontal member 32. In the construction shown, the arm extends between the bars 32$^a$ and 32$^b$ of the member 32 and coöperates with abutment pins 36 and 37 extending between the bars, so that upon rotation of the shaft in one direction the arms can engage with the pins 36 to shift the members 32 downwardly to carry the locking levers into locking position, and when the shaft rotates in the opposite direction the arms will engage with the pins 37 to swing the members 32 to their upper position to release the locking levers.

Where locking levers are provided at both sides of the vehicle, an arm 35 will be provided at opposite sides of the vehicle for engaging with the respective members 32, so that these members will be simultaneously actuated upon rotation of the shaft. In order that the shaft may be readily rotated from the exterior of the vehicle by attendants or automatically by suitable mechanism adjacent the track, each end of the shaft is provided with an actuating or trip lever 38, such trip lever being in position to be readily manipulated by hand or foot or to engage with a suitable stationary tripping slide adjacent the track. Such tripping slide will be situated at the unloading platform and will engage with the tripping levers just before the car comes to a final stop, thus automatically causing the arms 35 to raise the connecting members 32 and to withdraw the locking levers from the handle bar structures. When the car finally comes to rest the tripping levers will again be free of the tripping slide ready to be actuated by hand or foot to positively bring the locking levers into locking position if such levers are not fully brought into locking position by the force of gravity after the handle bar structures have been pulled in.

In order to prevent wilful or accidental movement of the locking levers 27 from locking position while the car is running, as, for example, by kicking against one of the arms 28 of the locking levers, I provide locking mechanism for the connecting members 32. As best shown in Fig. 1, a detent lever 39 is pivoted at its rear end to a pivot frame 40 secured to the vehicle body, its front end being connected by link 41 with the end of an arm 42 extending from the shaft 34. At its lower edge the lever 39 has the detent tooth 43 for coöperating with the abutment plate 44 secured to the connecting member 32 below said lever. The position of the tooth 43 is such that when the shaft 34 has been rotated to cause forward movement of the connecting members 32 to cause locking of the handle bar structures, the tooth will assume a position to the rear of the abutment 44, so that the members 32 are positively locked against rearward movement. This prevents any unlocking of the handle bar structures by accidental or wilful forward movement of the arms 28 of the locking levers. When, however, the shaft 34 is rotated in the opposite direction, the arm 42 will first cause the lever 39 to be swung to remove the tooth 43 from the path of the abutment 44, and then the members 32 can move rearwardly to effect movement of the locking levers 27 to release the handle bar 13 structures. Where locking levers are provided at both sides of the vehicle, a detent lever mechanism is preferably provided for each of the bars 32.

The shaft 34 and the members carried thereby and also the detent mechanism for the members 32 are below the car floor and are inaccessible to passengers. Furthermore, the arms 35, trip levers 38, and the trip levers 39 all tend by their weight to maintain the locking of the connecting members 32 so that accidental unlocking of such members is fully prevented, and it is only when the parts are manipulated by an attendant or automatically actuated by the tripping slides at the unloading platform that the connecting members 32 and the locking levers controlled thereby can become unlocked.

I thus provide improved handle bar structure locking mechanism in which the handle bar structures are positively and rigidly locked to lock the passengers to the seats and to provide a firm support for the passengers, the locking mechanism tending at all times by the force of gravity to assume locking position, and the force of gravity also tending to hold the various locking mechanisms in locked position. The mechanism can, however, at any time be readily manipulated by an attendant or automatically controlled by stationary tripping members past which the vehicle travels.

As changes and modifications are possible which would still come within the scope of my invention, I do not desire to be limited to the precise construction, arrangement and operation herein shown, and I therefore claim the following:

1. In a pleasure railway car, the combination with the car body and a seat therefor, of a handle bar structure pivoted to the car body and adapted to swing to one position to allow entrance of passengers to the seat and to another position to lock the passengers in the seat, and a detent for engaging the under side of said handle bar structure when in its latter position to lock such structure in such position.

2. In a pleasure railway vehicle, the combination with the vehicle body and a seat thereon, of a handle bar structure pivoted at its lower end to the body and adapted to be swung in one position to allow passengers to enter, and in another position to lock the passengers in the seat, a bell crank lever having an arm extending upwardly for detent engagement with the handle bar structure to lock said structure in its latter position, and actuating mechanism connected with the other arm of the bell crank lever.

3. In a pleasure railway vehicle, the combination of the vehicle body and the seat thereon, of a handle bar structure pivoted at its lower end to the body and adapted to be swung to one position to allow entrance of passengers to the seat and to another position to lock the passengers in the seat, a bell crank lever having one arm adapted for detent engagement with the handle bar structure to lock said structure in its latter position and the other arm of said bell crank lever extending downwardly, an actuating bar pivoted to said downwardly extending arm, a rock shaft, an actuating arm extending from said rock shaft and having actuating engagement with said bar, and means for rocking said shaft.

4. In a pleasure vehicle, the combination of the vehicle body and a seat, a handle bar structure pivoted at its lower end to said body and adapted to assume one position to allow entrance of passengers to the seat and another position to lock the passengers in the seat, a detent lever pivoted to the body and adapted to engage with the handle bar structure to lock said structure in its latter position, a bar pivoted to said lever and having abutments, a rock shaft, an arm extending from said rock shaft for engagement with said abutments, and an actuating lever extending from said shaft for causing rocking thereof and engagement of the actuating arm with said abutments to cause movement of said bar and said detent lever to cause movement of said detent lever into locking and unlocking positions with reference to said handle bar structure.

5. In a pleasure vehicle, the combination of the vehicle body and a seat, a handle bar structure pivoted at its lower end to said body and adapted to assume one position to allow entrance of passengers to the seat and another position to lock the passengers in the seat, a detent lever pivoted to the body and adapted to engage with the handle bar structure to lock said structure in its latter position, a bar pivoted to said lever and having abutments, a rock shaft, an arm extending from said rock shaft for engagement with said abutments, an actuating lever extending from said shaft for causing rocking thereof and engagement of the actuating arm with said abutments to cause movement of said bar and said detent lever to cause movement of said detent lever into locking and unlocking positions with reference to said handle bar structure, and detent mechanism controlled by the movement of said rock shaft to positively lock said bar and thereby said detent lever in locked position.

6. In a pleasure vehicle, the combination with the vehicle body having a seat, of a handle bar structure pivoted to said body and adapted to assume one position to allow entrance of passengers to the seat and to assume another position to lock the passengers in the seat, a detent lever pivoted to the body and adapted when in one position to allow said handle bar structure to be swung to its first position and to be swung into another position to engage with the handle bar structure to lock said structure in its latter position, a bar pivoted to said lever and having abutments, a rock shaft, an actuating arm extending from said rock shaft for engagement with said abutments, a second arm extending from said rock shaft, pivoted detent mechanism connected with said second arm, an abutment on said bar with which the detent mechanism may coöperate to lock the bar and thereby the detent lever in its locked position, and an actuating arm for said rock shaft, movement of said rock shaft actuating arm in one direction resulting in swing of said detent mechanism to release the bar and in movement of the bar to swing the detent lever to release the handle bar structure, and movement of said rock shaft actuating arm in the opposite direction causing swing of said bar to move the detent lever to lock the handle bar structure and to swing the detent mechanism into locking engagement with said bar.

7. In a pleasure vehicle, the combination with the vehicle body and its seat, of a substantially U-shaped handle bar structure pivoted at the ends of its limbs to said body and adapted to be swung into position to allow entrance of passengers to the seat and to be swung into a second position to lock the passengers in the seat, a bell crank detent lever having an arm adapted for detent engagement with said handle bar structure when in its second position, a horizontal bar pivoted to the other arm of said detent bell crank lever, said bar having abutments, a rock shaft, an arm extending toward said rock shaft and adapted to engage with said abutments to move said bar in opposite directions to thereby swing the detent lever, and an actuating arm extending from said shaft to control the rocking thereof, and detent mechanism for positively locking said bar after said bar has been moved to cause swing of the detent lever to lock said handle bar structure in its second position.

8. In a pleasure vehicle, the combination with the vehicle body and a seat thereon, of a handle bar structure adapted to swing in one position to allow entrance of passengers to the seat and to swing in another position to lock the passengers in the seat, a detent lever for engaging said handle bar structure to lock it in its second position, and actuating mechanism for said detent lever, said actuating mechanism and detent lever operating by gravity to follow the handle bar structure from its first position to its second position and to positively lock said handle bar structure in its second position.

9. In a pleasure vehicle, the combination with the vehicle body and a seat thereon, of a handle bar structure pivoted to the body and adapted to swing to one position to allow entrance of passengers to the seat and to swing to a second position to lock the passengers in the seat, detent mechanism for said handle bar structure operable by gravity to follow said structure from its first position to its second position and to then positively engage said handle bar structure to lock said structure in its second position, and actuating mechanism for positively moving said detent mechanism into its locked or unlocked positions.

10. In a pleasure vehicle, the combination with the vehicle body and a seat thereon, of a handle bar structure pivoted in front of the seat and adapted to assume one position to allow entrance of passengers to the seat and to assume a second position to lock the passengers in the seat, a pivoted locking lever having one arm extending upwardly and another arm extending downwardly below the vehicle body, said upwardly extending arm being adapted for detent engagement with said handle bar structure to lock said structure in its second position, a horizontal bar pivoted to said downwardly extending arm and having abutments, a rock shaft extending transversely of the vehicle body, a bell crank lever on said shaft having one arm extending downwardly for engagement with said abutments, pivoted detent mechanism having pivotal connection with the other arm of said bell crank lever, an abutment on said bar for coöperating with said detent mechanism, and an actuating arm at the end of said rock shaft at the outside of the vehicle and adapted to be suitably operated to cause rocking of said shaft in one direction to cause actuation of the detent mechanism to release the bar and movement of the bar to swing the detent lever to release the handle bar structure, and rocking in the opposite direction to effect movement of the bar to lock the handle bar structure and to carry the detent mechanism into detent engagement with its associated abutment on said bar, thereby to positively lock said bar and detent lever.

11. In a pleasure vehicle, the combination with the vehicle body and seats thereon, of a handle bar structure for each seat pivoted at its lower end to the vehicle, each structure being adapted to assume one position to allow entrance of passengers to the associated seat, and to assume a second position to lock the passengers in the seat, a pivoted locking lever associated with each handle bar structure for positively locking the structure in its second position, a bar pivoted to said locking levers to be actuated to cause simultaneous operation thereof, a shaft, an arm extending from said shaft adapted for engagement with said bar to cause longitudinal movement of said bar upon rotation of said shaft, and an actuating arm extending from said shaft to be suitably actuated to rock said shaft to cause simultaneous operation of the locking levers.

12. In a pleasure vehicle, the combination with the vehicle body and seats thereon, of a handle bar structure for each seat pivoted at its lower end to the vehicle body in front of the seat, each handle bar structure being adapted to swing outwardly to allow entrance of passengers to the associated seat, and to swing inwardly to lock the passengers to the seat, a locking lever for each handle bar structure pivoted to the vehicle body to be swung into one position to release the associated handle bar and to swing into a second position to positively lock said handle bar structure in its second position, a bar pivoted to said locking levers, said locking levers and bar operating by gravity to follow the handle bar structures from their first position to their second position and to then simultaneously lock the handle bar structures in their second position, and actuating mechanism for coöperating with said bar to cause positive movement of said locking levers into locking and unlocking positions.

13. In a pleasure vehicle, the combination with the vehicle body and seats thereon, of a handle bar structure for each seat pivoted at its lower end to the vehicle body in front of the seat, each handle bar structure being adapted to swing outwardly to allow entrance of passengers to the associated seat, and to swing inwardly to lock the passengers to the seat, a locking lever for each handle bar structure pivoted to the vehicle body to be swung into one position to release the associated handle bar structure and to be swung into a second position to positively lock said handle bar structure in its second position, a bar pivoted to said locking levers, said locking levers and bar operating by gravity to follow the handle bar structures from their first position to their second position and to then simultaneously lock the handle bar structures in their second position, a shaft extending transversely of the vehicle, an arm extending from said shaft and adapted to coöperate with said bar to effect longitudinal movement thereof upon rotation of said shaft and to effect locking or unlocking movement of said locking levers, and an actuating arm extending from said shaft to be engaged by suitable means to effect rotation of said shaft and thereby movement of said arm to control the movements of said locking levers.

14. In a pleasure railway car, the combination with the car body and a seat therefor, of a handle bar structure pivoted adjacent the car floor and adapted to swing to one position to allow entrance of passengers to the seat and to another position to lock the passengers in the seat, and a detent prop adapted to be swung into position below said handle bar structure when in its lateral position to lock such structure in such position.

In witness whereof I hereunto subscribe my name this 2nd day of November, A. D. 1911.

JOHN A. MILLER.

Witnesses:
R. P. BEAMER,
R. S. COHOON.

---

Copies of this patent may be obtained for five cents each, by addressing the "Commissioner of Patents, Washington, D. C."